(12) United States Patent
Luo

(10) Patent No.: US 10,498,121 B1
(45) Date of Patent: Dec. 3, 2019

(54) WATERPROOF FUSE CONVERGENCE BOX

(71) Applicant: TI-LANE PRECISION ELECTRONIC CO., LTD, Yongzhou, Hunan (CN)

(72) Inventor: Baojun Luo, Guangdong (CN)

( * ) Notice: Subject to any disclaimer, the term of this patent is extended or adjusted under 35 U.S.C. 154(b) by 0 days.

(21) Appl. No.: 16/506,985

(22) Filed: Jul. 9, 2019

(30) Foreign Application Priority Data

Nov. 1, 2018 (CN) .......................... 2018 1 1295491

(51) Int. Cl.
*H02G 3/08* (2006.01)
*H02G 3/18* (2006.01)
*H02S 40/34* (2014.01)

(52) U.S. Cl.
CPC ............. *H02G 3/088* (2013.01); *H02G 3/081* (2013.01); *H02G 3/18* (2013.01); *H02S 40/34* (2014.12)

(58) Field of Classification Search
CPC .......... H02G 3/088; H02G 3/081; H02G 3/18; H02S 40/34
USPC ........................................................ 174/535
See application file for complete search history.

(56) References Cited

U.S. PATENT DOCUMENTS

| 2004/0159455 A1* | 8/2004 | Onizuka | ................ | H05K 7/026 174/50 |
| 2007/0215614 A1* | 9/2007 | Matsui | .................. | H02G 3/088 220/3.2 |
| 2007/0270045 A1* | 11/2007 | Korczynski | ......... | B60R 16/0238 439/723 |
| 2009/0130882 A1* | 5/2009 | Yamaguchi | ............ | H05K 5/061 439/271 |
| 2009/0163053 A1* | 6/2009 | Yamaguchi | .......... | H01R 9/2466 439/76.1 |
| 2012/0000689 A1* | 1/2012 | Shu | ........................ | H02S 40/34 174/59 |

(Continued)

*Primary Examiner* — Sherman Ng

(57) ABSTRACT

A waterproof fuse convergence box comprises a box body, an upper cover, an installing plate, a fuse, a convergence terminal and at least one dispersing terminal, the box body is provided with installing holes I and an installing hole II; the installing plate is fixed into the box body; the fuse is clamped and fixed through clamping seats I and clamping seats II which are arranged on the installing plate; the quantity of the dispersing terminal corresponds to the quantity of the installing holes I, the clamping seats I and the clamping seats II; the dispersing terminal is fixed at the installing holes I; a waterproof seal ring I is arranged at a contact position where the dispersing terminal and the installing holes I are contacted; the dispersing terminal is electrically connected through the clamping seats I of an electric conductor; the convergence terminal is fixed at the installing hole II; a waterproof seal ring II is arranged at a contact position where the convergence terminal and the installing hole II are contacted; the convergence terminal is electrically connected with all the clamping seats II through conducting pieces; the box body is clamped and fixedly connected with the upper cover; a waterproof seal ring III is arranged at a contact position where the box body and the upper cover are contacted; and the box body is provided with an installing support lug for fixing the box body. The convergence box has the advantages of water prevention and convenient installation and maintenance.

9 Claims, 5 Drawing Sheets

(56) References Cited

U.S. PATENT DOCUMENTS

2013/0003307 A1\* 1/2013 Jang ........................ H02S 40/34
361/709

\* cited by examiner

WATERPROOF FUSE CONVERGENCE BOX

CROSS-REFERENCE TO RELATED APPLICATIONS

This application claims priority to Chinese Patent Application No. 201811295491.0 with a filing date of Nov. 1, 2018. The content of the aforementioned applications, including any intervening amendments thereto, are incorporated herein by reference.

TECHNICAL FIELD

The disclosure relates to the field of connectors for solar panels, and particularly relates to a waterproof fuse convergence box.

BACKGROUND OF THE PRESENT INVENTION

With the development of the society and the advancement of science and technology, environmentally-friendly and pure energy has gradually attracted human attention. As an environmentally-friendly and endlessly accessible new energy source, photovoltaics are valued by people. The photovoltaic panel is a common device for converting solar energy, and has high requirements for connectors during the use of the photovoltaic panel, which requires high electrical connection tightness, seal and firmness.

The convergence box is widely used to connect carriers to achieve the purposes of current convergence and protection of back-end equipment. However, the convergence box and the fuse on the current market are in one-to-one connection. First, due to large volume, heavy weight and large installation area of the convergence box, the installation of the convergence box is very difficult, and it is more difficult to replace the fuse after the fuse is damaged. Second, after the convergence box is installed, the convergence box needs to be exposed to the outdoors. In order to meet normal work needs, waterproof and anti-corrosion requirements need to be fully considered when the convergence box is designed.

SUMMARY OF PRESENT INVENTION

Aiming at the defects in the prior art, the disclosure provides a waterproof fuse convergence box having a waterproof function and facilitating installation and maintenance.

In order to achieve the above aim, the technical solution adopted by the disclosure is as follows: a waterproof fuse convergence box comprises a box body, an upper cover, an installing plate, a fuse, a convergence terminal and at least one dispersing terminal, the box body is provided with installing holes I and an installing hole II; the installing plate is fixed into the box body; the fuse is clamped and fixed through clamping seats I and clamping seats II which are arranged on the installing plate; the quantity of the dispersing terminal corresponds to the quantity of the installing holes I, the clamping seats I and the clamping seats II; the dispersing terminal is fixed at the installing holes I; a waterproof seal ring I is arranged at a contact position where the dispersing terminal and the installing holes I are contacted; the dispersing terminal is electrically connected through the clamping seats I of an electric conductor; the convergence terminal is fixed at the installing hole II; a waterproof seal ring II is arranged at a contact position where the convergence terminal and the installing hole II are contacted; the convergence terminal is electrically connected with all the clamping seats II through conducting pieces; the box body is clamped and fixedly connected with the upper cover; a waterproof seal ring III is arranged at a contact position where the box body and the upper cover are contacted; and the box body is provided with an installing support lug for fixing the box body.

With the technical solution of the disclosure, each wire has a fuse structure for the purpose of active safety. Each fuse is secured with a clamping seat structure, so that the fuse can be conveniently and quickly replaced after the fuse is burnt out. The convergence box body of the fuse is fixedly connected with the upper cover through clamping, which is convenient and quick in operation. Each assembly joint is waterproofed with a waterproof ring, which meets the requirements of IP67 and is convenient to assemble and operate. When the requirement of a creepage distance is met, the external size of the box is reduced as much as possible to achieve the purpose of saving space. At least one dispersing terminal and one convergence terminal realize the function of current convergence for multiple fuses. The installation is easy; the operation is simple; replacement is easy; and installation and disassembly of the electrical connector are realized in a small space.

In a further improvement, the top of the box body is provided with an installing groove for installing the waterproof seal ring III. The design of the installing groove facilitates the installation and fixation of the waterproof seal ring III and ensures a good sealing effect.

In a further improvement, a support column for supporting the installing plate is arranged in the box body; and the installing plate is fixed to the support column through a screw. The design of the support column facilitates the heat dissipation of the internal fuse.

In a further improvement, the dispersing terminal is provided with symmetrical clamping blocks I for external quick insertion. The design of the clamping blocks I enables the dispersing terminal to be inserted and fixedly connected with an external dispersing circuit.

In a further improvement, the convergence terminal is provided with symmetrical clamping blocks II for external quick insertion. The design of the clamping blocks II enables the dispersing terminal to be inserted and fixedly connected with an external convergence circuit.

In a further improvement, the top of the dispersing terminal is provided with a fool-proof slot I. The occurrence rate of insertion errors is reduced.

In a further improvement, the top of the convergence terminal is provided with a fool-proof slot II. The occurrence rate of insertion errors is reduced.

In a further improvement, the bottom of the box body is provided with a guiding groove that facilitates the matching with an external bracket. The guiding groove for quick docking with an installing bracket of a customer is designed on the housing of the product, thereby improving installation efficiency and fixing stability.

DETAILED DESCRIPTION OF PREFERRED EMBODIMENTS

The preferred embodiments of the disclosure are further described below with reference to the drawings.

Figure 1:
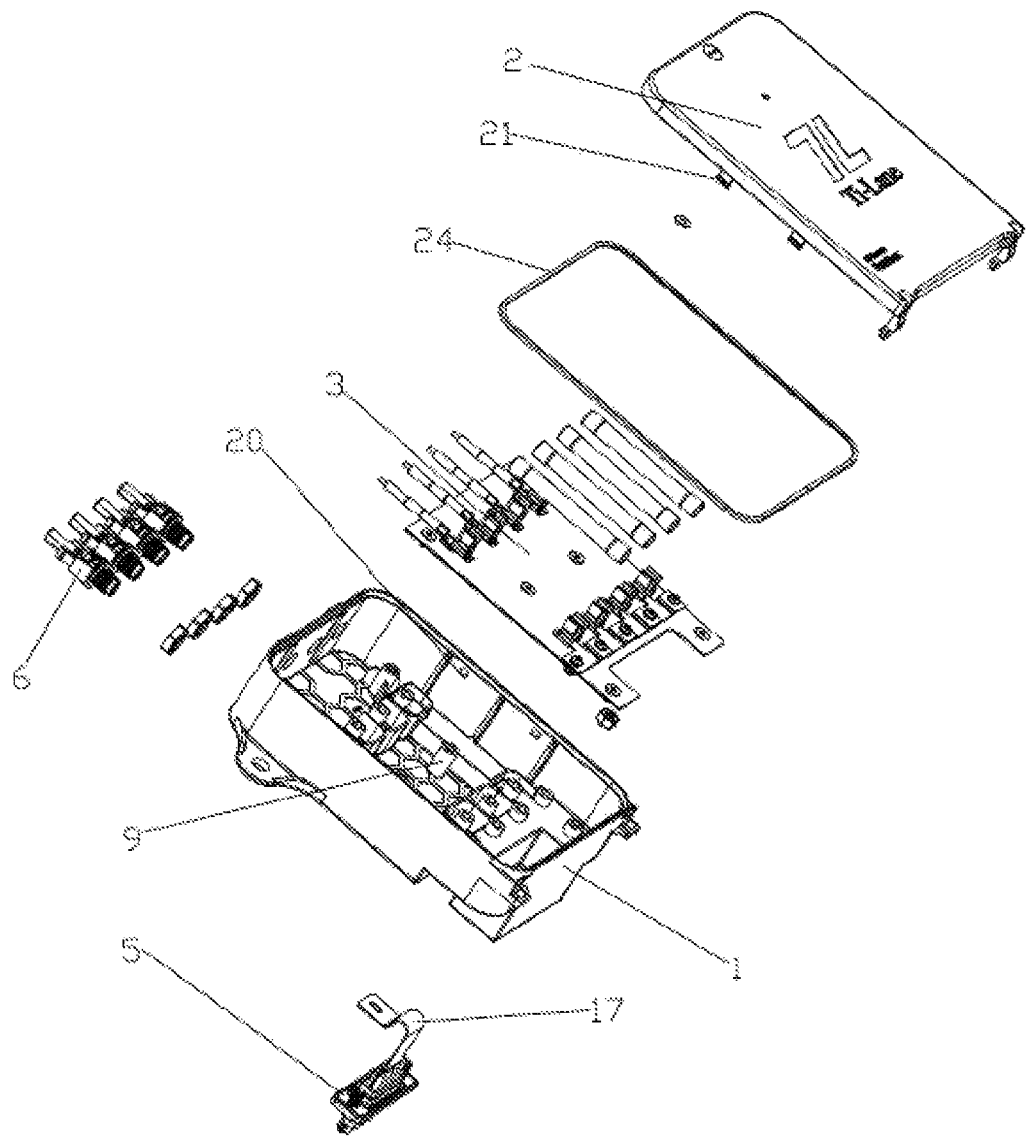
FIG. 1 is an exploded diagram of a waterproof fuse convergence box.
Figure 2:
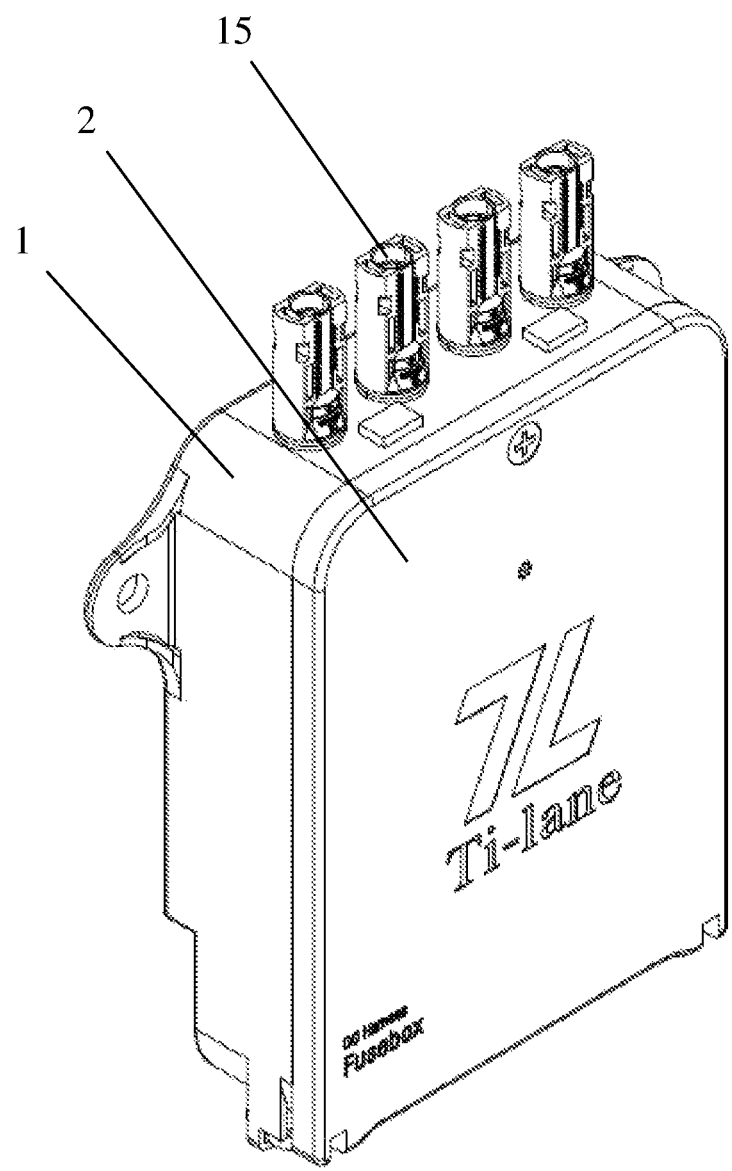
FIG. 2 is a three-dimensional diagram of a waterproof fuse convergence box with an upper cover.
Figure 3:
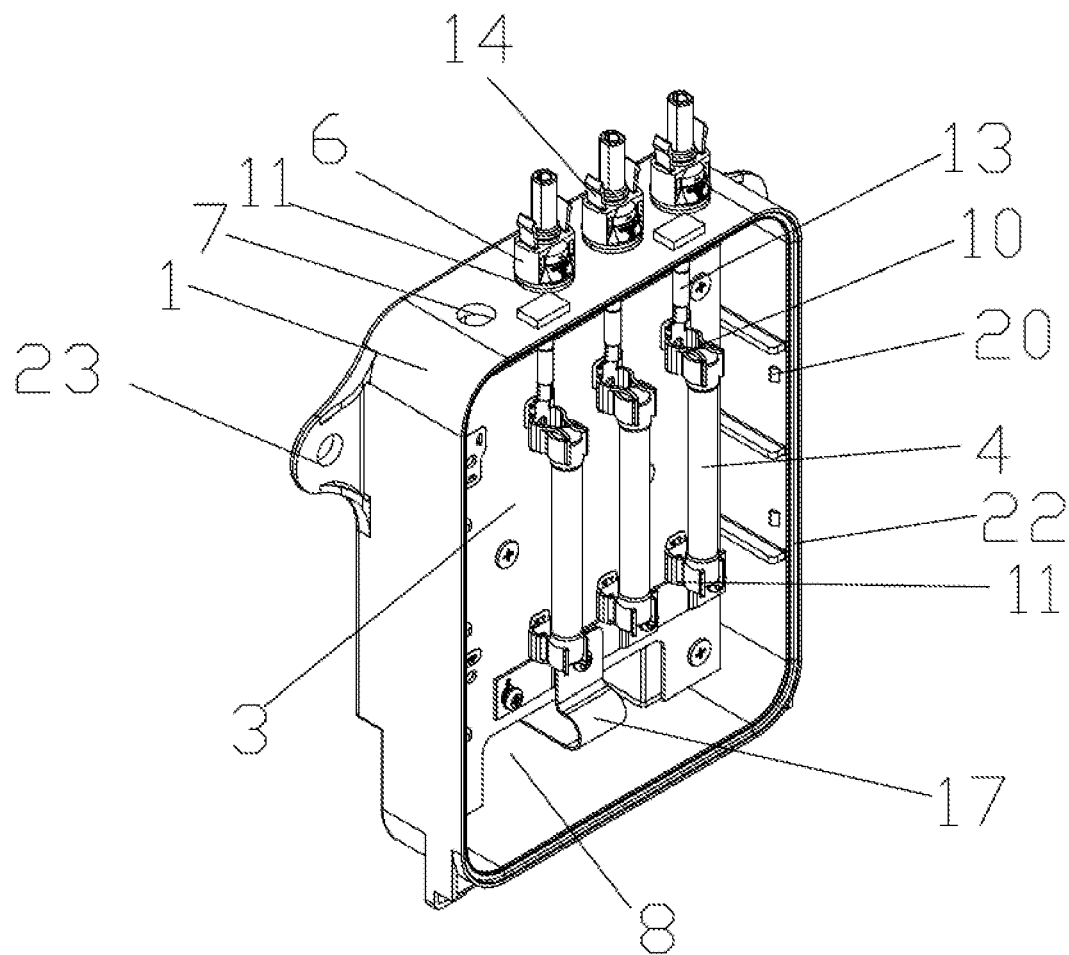
FIG. 3 is a three-dimensional diagram of a waterproof fuse convergence box without an upper cover.
Figure 4:
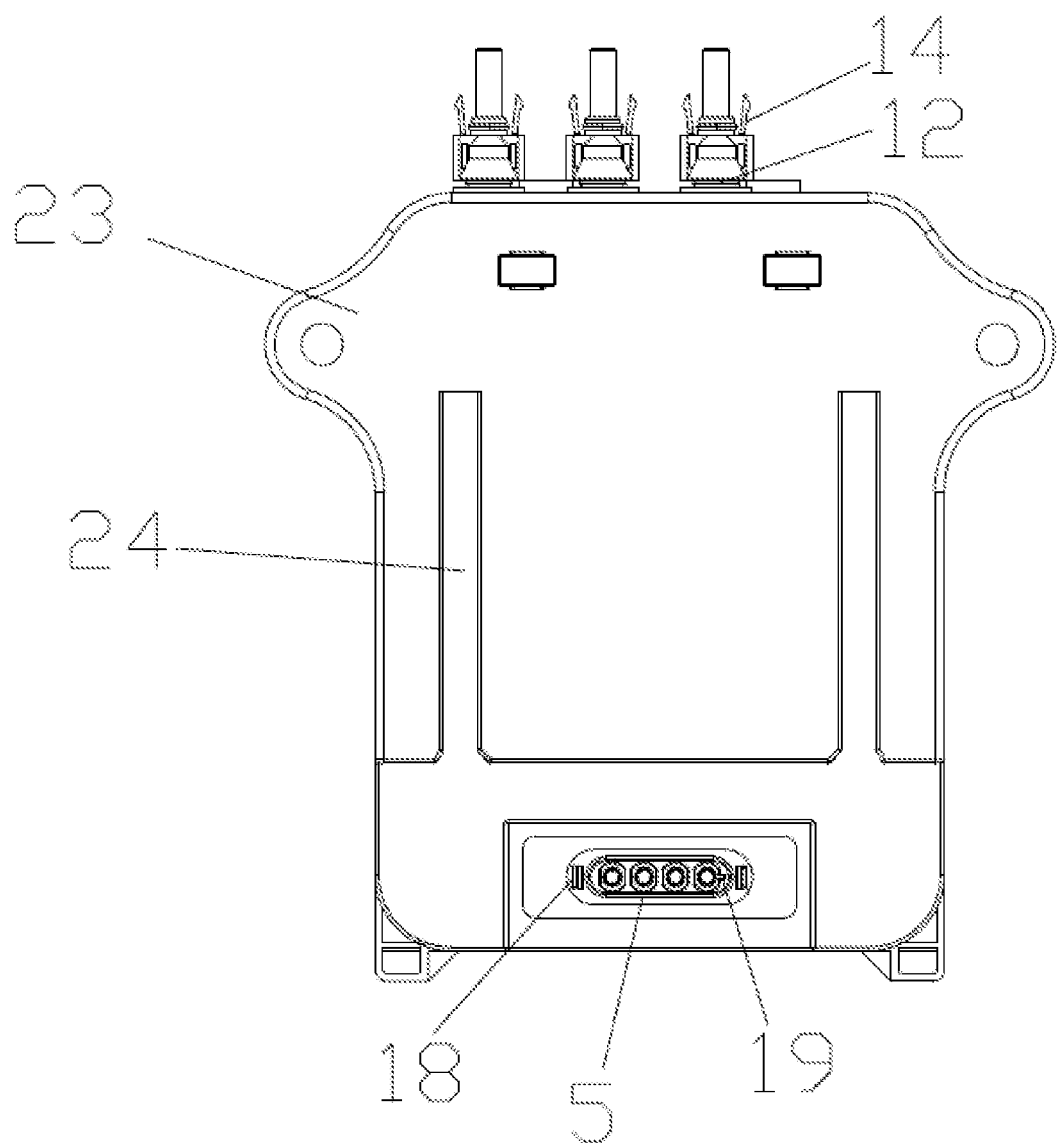
FIG. 4 is a rear view of a waterproof fuse convergence box.
Figure 5:
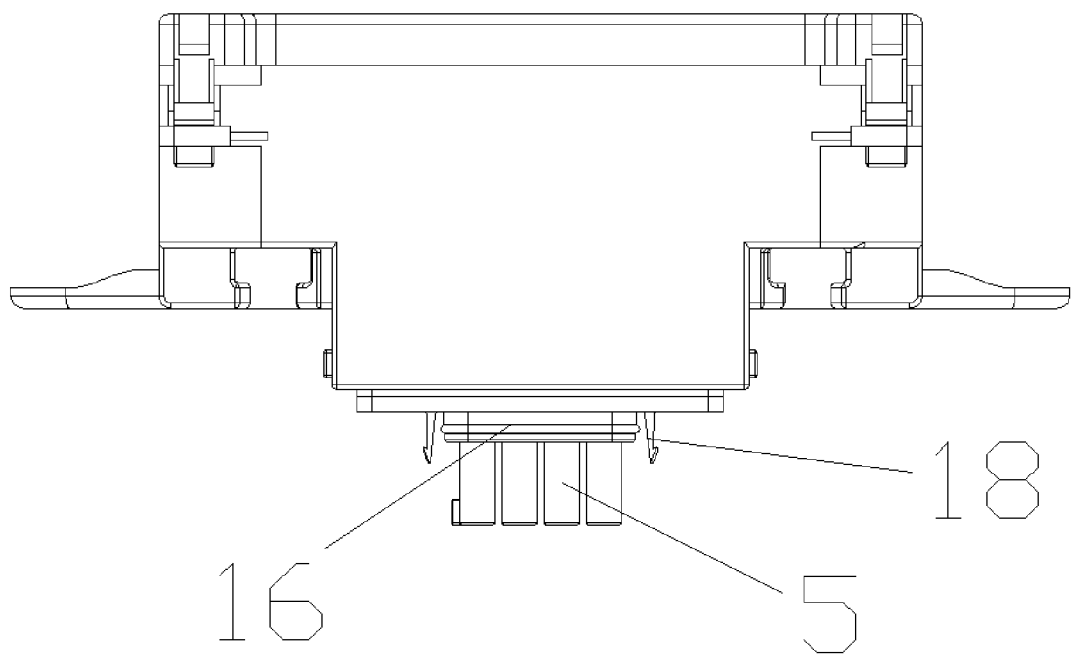
FIG. 5 is a bottom view of a waterproof fuse convergence box.

As shown in FIG. 1 to FIG. 3, a waterproof fuse convergence box comprises a box body 1, an upper cover 2, an installing plate 3, a fuse 4, a convergence terminal 5 and at least one dispersing terminal 6.

The box body is provided with installing holes I 7 and an installing hole II 8; and the installing plate is fixed into the box body. To facilitate the heat dissipation of the fuse, in the solution, preferably, a support column 9 for supporting the installing plate is arranged in the box body; and the installing plate is fixed to the support column through a screw. The fuse is clamped and fixed through clamping seats I 10 and clamping seats II 11 which are arranged on the installing plate.

The quantity of the dispersing terminal 6 corresponds to the quantity of the installing holes I, the clamping seats I and the clamping seats II. The dispersing terminal is fixed at the installing holes I; a waterproof seal ring I 12 is arranged at a contact position where the dispersing terminal and the installing holes I are contacted; and the dispersing terminal is electrically connected through the clamping seats I of an electric conductor 13. To facilitate rapid connection with the outside, the dispersing terminal is provided with symmetrical clamping blocks I 14 for external quick insertion. To prevent an insertion error by a user, in this design, the top of the dispersing terminal is provided with a fool-proof slot I 15.

The convergence terminal is fixed at the installing hole II; a waterproof seal ring II 16 is arranged at a contact position where the convergence terminal and the installing hole II are contacted; and the convergence terminal is electrically connected with all the clamping seats II through conducting pieces 17. To facilitate rapid connection with the outside, the convergence terminal is provided with symmetrical clamping blocks II 18 for external quick insertion. To prevent an insertion error by a user, in this design, the top of the convergence terminal is provided with a fool-proof slot II 19.

The box body is clamped and fixedly connected with the upper cover. In this solution, preferably, a stopping block 20 is arranged in the box body. An inner side of the upper cover is provided with a clamping block 21 matched with the stopping block; and the box body is clamped and fixedly connected with the upper cover through the matching of the stopping block and the clamping block. Of course, clamping and fixation of the disclosure are not limited to the above structure, and other clamping and matching types, such as matching of a clamping groove and a buckle, may be used. A waterproof seal ring III 24 is arranged at a contact position where the box body and the upper cover are contacted. To facilitate installation and improve a waterproof effect, the top of the box body is provided with an installing groove 22 for installing the waterproof seal ring III.

To provide the convenience for subsequent customers in the process of use, the box body is provided with an installing support lug 23 for fixing the box body. The bottom of the box body is provided with a guiding groove 24 that facilitates the matching with an external bracket.

The above embodiments are only used to describe the technical concepts and features of the disclosure, and are intended to enable those of ordinary skill in the art to understand and implement the contents of the disclosure, not intended to limit the protection scope of the disclosure. Any equivalent variation or modification made in accordance with the spirit and essence of the disclosure shall be included in the protection scope of the disclosure.

I claim:

1. A waterproof fuse convergence box, comprising a box body, an upper cover, an installing plate, a fuse, a convergence terminal and at least one dispersing terminal, wherein the box body is provided with installing holes I and an installing hole II; the installing plate is fixed into the box body; the fuse is clamped and fixed through clamping seats I and clamping seats II which are arranged on the installing plate; the quantity of the dispersing terminal corresponds to the quantity of the installing holes I, the clamping seats I and the clamping seats II; the dispersing terminal is fixed at the installing holes I; a waterproof seal ring I is arranged at a contact position where the dispersing terminal and the installing holes I are contacted; the dispersing terminal is electrically connected through the clamping seats I of an electric conductor; the convergence terminal is fixed at the installing hole II; a waterproof seal ring II is arranged at a contact position where the convergence terminal and the installing hole II are contacted; the convergence terminal is electrically connected with all the clamping seats II through conducting pieces; the box body is clamped and fixedly connected with the upper cover; a waterproof seal ring III is arranged at a contact position where the box body and the upper cover are contacted; and the box body is provided with an installing support lug for fixing the box body.

2. The waterproof fuse convergence box according to claim 1, wherein a stopping block is arranged in the box body; an inner side of the upper cover is provided with a clamping block matched with the stopping block; and the box body is clamped and fixedly connected with the upper cover through the matching of the stopping block and the clamping block.

3. The waterproof fuse convergence box according to claim 1, wherein a top of the box body is provided with an installing groove for installing the waterproof seal ring III.

4. The waterproof fuse convergence box according to claim 1, wherein a support column for supporting the installing plate is arranged in the box body; and the installing plate is fixed to the support column through a screw.

5. The waterproof fuse convergence box according to claim 1, wherein the dispersing terminal is provided with symmetrical clamping blocks I for external quick insertion.

6. The waterproof fuse convergence box according to claim 1, wherein the convergence terminal is provided with symmetrical clamping blocks II for external quick insertion.

7. The waterproof fuse convergence box according to claim 1, wherein a top of the dispersing terminal is provided with a fool-proof slot I.

8. The waterproof fuse convergence box according to claim 1, wherein a top of the convergence terminal is provided with a fool-proof slot II.

9. The waterproof fuse convergence box according to claim 1, wherein a bottom of the box body is provided with a guiding groove that facilitates the matching with an external bracket.

\* \* \* \* \*